July 29, 1952 F. R. CASCIANO 2,604,721
FISHHOOK AND LEADER HOLDER, INCLUDING
SLIDABLE ANCHOR MEMBER
Filed Aug. 17, 1948
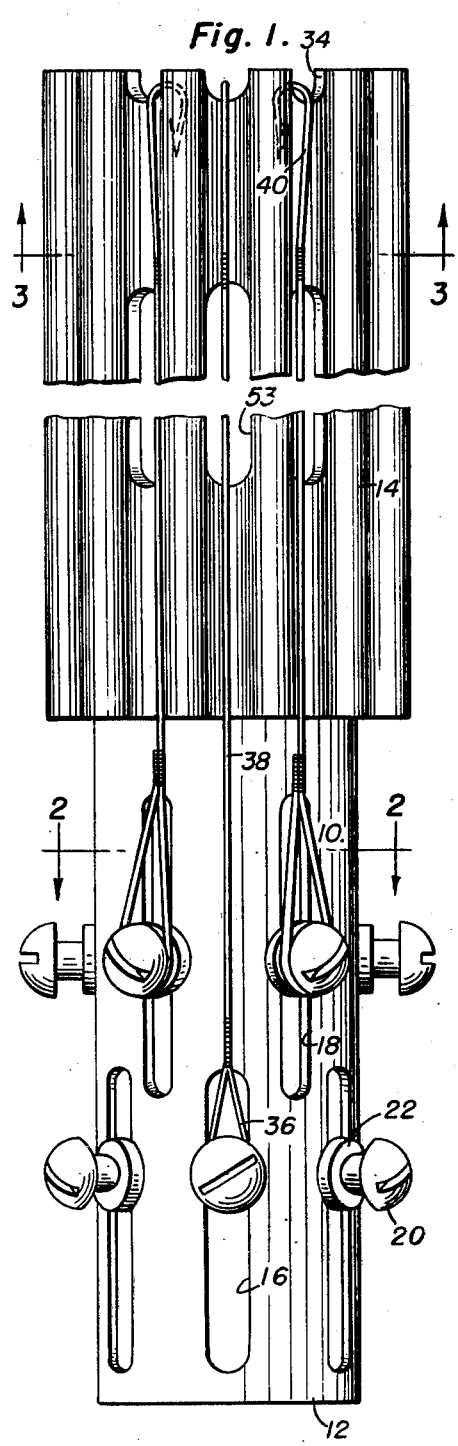
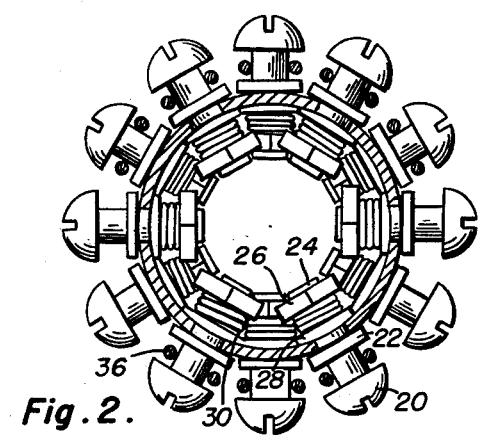
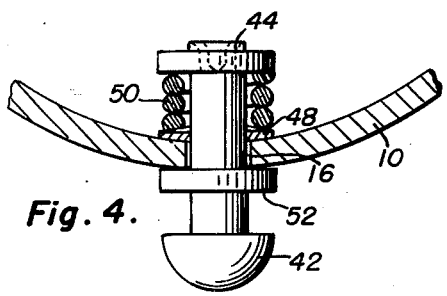
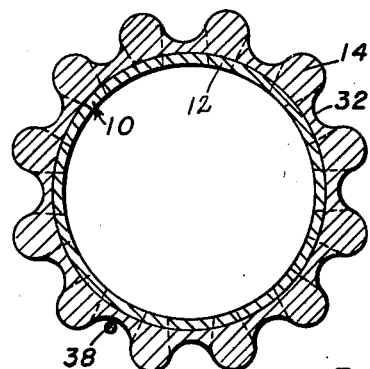
Frederick R. Casciano
INVENTOR.

Patented July 29, 1952

2,604,721

UNITED STATES PATENT OFFICE 2,604,721

FISHHOOK AND LEADER HOLDER, INCLUDING SLIDABLE ANCHOR MEMBER

Frederick R. Casciano, Linden, N. J.

Application August 17, 1948, Serial No. 44,752

1 Claim. (Cl. 43—57.5)

This invention relates to new and useful improvements in fishing apparatus and the primary object of the present invention is to provide a device for supporting and holding fishing hooks and leaders in a safe manner so that the same may be conveniently carried, transported or stored.

Another important object of the present invention is to provide a holder for fish hooks and leaders including a plurality of slidable anchoring members for receiving the looped ends of leaders and embodying novel and improved means for retaining said anchor members in an adjusted position for holding leaders of various lengths in a stretched or taut position.

A further object of the present invention is to provide a holder for fish hooks and leaders that is extremely small and compact in structure and which will support a plurality of leaders and hooks in such a manner as to permit the same to be removed and applied individually relative to said holder.

A still further aim of the present invention is to provide a device of the aforementioned character that is simple and practical in construction, strong and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of the present invention, showing the same in use, and with parts thereof broken away;

Figure 2 is a transverse horizontal sectional view taken substantially on the plane of section line 2—2 of Figure 1;

Figure 3 is a transverse horizontal sectional view taken substantially on the plane of section line 3—3 of Figure 1; and, Figure 4 is an enlarged transverse horizontal sectional view of the present invention and illustrating the anchoring means in slightly modified form.

Referring now to the drawings in detail, wherein for the purpose of illustration, there is disclosed a preferred embodiment of the present invention, the numeral 10 represents a cylindrical body of any suitable lightweight, inexpensive material such as plastic or the like, and which includes an inner end portion 12 and an enlarged outer end portion 14 that is preferably in the form of an enlarged outer cylinder which is preferably fixed to and about the body 10, although the same could assume the form of an integral portion of the body 10 without deviating from the scope for which it is intended.

A first group of circumferentially spaced, longitudinal slots 16 are provided in the body 10, adjacent the inner end thereof, and are staggered relative to a further group of circumferentially spaced, longitudinal slots 18 provided in the body 10 outwardly from the slots 16 and interposed between the ends of the body 10.

Slidably engaging each of the slots 16 and 18, is a headed bolt 20 having a fixed shoulder or bearing portion 22 that bears against the outer periphery of the body 10. Each of the bolts 20 is provided with a threaded portion 24 that is disposed within the body 10 and which receivably engages a nut 26.

A slidable washer or pressure element 28 is mounted on the inner end of each bolt 20 and is urged against the inner periphery of the body 10 by coil springs 30 that embrace the bolts 20 and which are biased between the washers 28 and the nuts 26 to yieldingly retain the bolts 20 in an adjusted position in the slots 16 and 18.

The outer portion or cylinder 14 is provided with a plurality of circumferentially spaced, longitudinal grooves or channeled recesses 32 that will align the slots 16 and 18.

The outer extremity of the outer cylinder 14 is provided with a plurality of circumferentially spaced notches or recesses 34 one of which communicates with each of the grooves 32.

In practical use of the present invention, the loop portions 36 of leaders 38 are engaged on the bolts 20 between the head portions of the bolts and the fixed bearing portions 20 thereof. The leaders extend through the grooves 32 and the hooks 40 carried by the leaders are engaged in the recesses 34, as shown best in Figure 1 of the drawings.

The resilient elements 30 will permit the bolts 20 to be adjusted to accommodate leaders of various lengths and the barbed end of the hooks 40 will be disposed within the outer cylinder 14 in such a manner as to permit the holder to be carried by a user in a safe and satisfactory manner.

Reference is now directed to Figure 4, wherein there is disclosed the bolts or anchoring members in slightly modified form. In this embodiment, the bolts or anchoring members are designated by the numeral 42 and the inner ends of the bolts 42 are riveted upon a bearing cap or washer 44.

Washers 48 are slidable on the bolts 42 and are urged against the inner periphery of the body 10 by coil springs 50 that are biased between the washers 44 and 48.

The fixed flanges 52 on the bolts 42 bear against the outer periphery of the body 10 and cooperate with the washers 48 to retain the bolts 42 in a selected adjusted position in the slots 16 and 18.

When a group of leaders are applied to the holder, it is noted that the same will be spaced relative to each other and that the same will be spaced relative to each other and that the same will be prevented from movement due to the channels in which the same lie. To remove the leaders from the present holders, it is merely necessary to slide the bolts toward the outer cylinder 14 whereby the loop ends of the leaders may be slipped from the bolts and the hooks disengaged from the notches 34 and recesses 32.

In order to accommodate leaders of other lengths, there is provided a plurality of hook receiving apertures or slots 53 in the outer cylinder 14.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A fish leader and hook holding device comprising an elongated cylindrical body having inner and outer portions; a cylindrical member disposed radially outwardly of and embracing the outer end portion of said body and fixed thereto; said member having a plurality of circumferentially spaced, longitudinally extending, leader receiving grooves in its outer periphery; said member also having a group of circumferentially spaced notches therein for receiving fish hooks; the inner end portion of said body having a first series of circumferentially spaced, longitudinally extending slots and a second series of circumferentially spaced, longitudinally extending slots, the first series of slots being angularly staggered with respect to the second series of slots and means in said slots for anchoring the looped ends of leaders attached to said fish hooks received in said notches to hold said hooks and leaders on the device.

FREDERICK R. CASCIANO.

REFERENCES CITED

The following references are of record in the file of this patent:

UNITED STATES PATENTS

| Number | Name | Date |
|---|---|---|
| 667,676 | Cantrell | Feb. 12, 1901 |
| 742,040 | Kurtz, Sr. | Oct. 20, 1903 |
| 1,301,285 | Leonard | Apr. 22, 1919 |
| 1,451,256 | Gardner | Apr. 10, 1923 |
| 1,578,631 | Bolton | Mar. 30, 1926 |
| 1,868,415 | Gundersen | July 19, 1932 |
| 2,078,321 | Freimann et al. | Apr. 27, 1937 |
| 2,080,794 | Squassoni | May 18, 1937 |
| 2,121,677 | Anderson | June 21, 1938 |
| 2,448,728 | Omohundro | Sept. 7, 1948 |

FOREIGN PATENTS

| Number | Country | Date |
|---|---|---|
| 401,113 | Great Britain | Nov. 9, 1933 |